(12) United States Patent
Baszucki et al.

(10) Patent No.: US 9,536,344 B1
(45) Date of Patent: Jan. 3, 2017

(54) AUTOMATIC DECORATION OF A THREE-DIMENSIONAL MODEL

(75) Inventors: David B. Baszucki, Portola Valley, CA (US); Erik S. Cassel, San Mateo, CA (US); Matt Dusek, Belmont, CA (US); John Shedletsky, Woodside, CA (US)

(73) Assignee: Roblox Corporation, Menlo Park, CA (US)

( * ) Notice: Subject to any disclaimer, the term of this patent is extended or adjusted under 35 U.S.C. 154(b) by 1357 days.

(21) Appl. No.: 11/998,563

(22) Filed: Nov. 30, 2007

(51) Int. Cl.
*G06T 15/04* (2011.01)
*G06T 13/40* (2011.01)

(52) U.S. Cl.
CPC .......... *G06T 15/04* (2013.01); *A63F 2300/695* (2013.01); *G06T 13/40* (2013.01)

(58) Field of Classification Search
CPC ................. G06T 15/04; G06T 2210/16; A63F 2300/6623
See application file for complete search history.

(56) References Cited

U.S. PATENT DOCUMENTS

| 5,867,166 | A  | * | 2/1999 | Myhrvold et al. | 345/419 |
|-----------|----|----|---------|-----------------|---------|
| 6,310,627 | B1 | * | 10/2001 | Sakaguchi | 345/630 |
| 6,478,680 | B1 | * | 11/2002 | Yoshioka et al. | 463/43 |
| 6,826,727 | B1 | * | 11/2004 | Mohr et al. | 715/235 |
| 6,879,323 | B1 | * | 4/2005 | Takezawa et al. | 345/420 |
| 7,409,259 | B2 | * | 8/2008 | Reyes Moreno | 700/132 |
| 2001/0034255 | A1 | * | 10/2001 | Hayama et al. | 463/1 |
| 2002/0119811 | A1 | * | 8/2002 | Yabe et al. | 463/8 |
| 2003/0051255 | A1 | * | 3/2003 | Bulman et al. | 725/135 |
| 2003/0206171 | A1 | * | 11/2003 | Kim et al. | 345/473 |
| 2005/0007384 | A1 | * | 1/2005 | Yamada et al. | 345/619 |
| 2006/0188144 | A1 | * | 8/2006 | Sasaki et al. | 382/154 |
| 2007/0083383 | A1 | * | 4/2007 | Van Bael et al. | 705/1 |
| 2007/0146389 | A1 | * | 6/2007 | Distler | 345/629 |
| 2007/0167204 | A1 | * | 7/2007 | Lyle et al. | 463/9 |
| 2007/0242078 | A1 | * | 10/2007 | Lopez et al. | 345/582 |
| 2008/0111816 | A1 | * | 5/2008 | Abraham et al. | 345/420 |
| 2009/0144173 | A1 | * | 6/2009 | Mo et al. | 705/27 |

FOREIGN PATENT DOCUMENTS

KR          1020040116785       *   8/2005   ............. G06T 15/00

OTHER PUBLICATIONS

Tyler, Denise. Practical Poser 7. Published by Course Technology PTR, Publication Date Dec. 1, 2006; Print ISBN-10: 1-5845-0478-1 and Web ISBN-10: 1-4354-5792-7. pp. 63,65,66,68-70, 249-255, and 266.*

(Continued)

*Primary Examiner* — Daniel Hajnik
(74) *Attorney, Agent, or Firm* — Lowenstein Sandler LLP

(57) ABSTRACT

A method and apparatus for automatically decorating a three-dimensional model is disclosed. The method may include receiving an image file from a user. The image file is to decorate a surface of a three-dimensional model upon display of the three-dimensional model in a simulated three-dimensional world. The method may also include automatically formatting the image file for display on the three-dimensional model in response to receiving the image file, and storing the formatted image file in a database.

23 Claims, 10 Drawing Sheets

(56) References Cited

OTHER PUBLICATIONS

Poser 7 Revealed: The E Frontier Official Guide, By: Kelly Murdock, Publisher: Course Technology PTR, Pub. Date: Dec. 1, 2006, Print ISBN-10: 1-5986-3296-5, pp. 420-424.*

NEscher 2 tutorials, "Introduction to Creating Clothing in Second Life" and "Creating Your First Shirt in Second Life", Nicola Escher, http://nicolaescher.com/tutorials, Jan. 2007.*

Nicola Escher, "Creating Your First Shirt in Second Life" n.Escher Fashion, Tutorials, Gallery, Journal, http://nicolaescher.com/tutorials/creating-your-first-shirt.php, Copyright 2005-2007 Scott McMillin, First version: Apr. 25, 2004, Minor Revision Jan. 6, 2007, pp. 1-5.

Keef's IMVU, "Develop, How to make a Shirt by Retexturing Using Photoshop 7", downloaded from: http://www.geocities.com/slkeithx/IMVU/Tutorials/IMVUDevelopShirt.htm, pp. 1-20.

\* cited by examiner

US 9,536,344 B1

AUTOMATIC DECORATION OF A THREE-DIMENSIONAL MODEL

FIELD OF THE INVENTION

This invention relates to the field of computer-aided modeling of virtual reality and, in particular, to the computer-aided decoration of models in a three-dimensional virtual world.

BACKGROUND

Building and playing with models online is becoming increasingly popular among various users. Internet-based virtual worlds are simulated, enabling users to travel within a virtual world, play games within the virtual world, and interact with other inhabitants (i.e., other users) of the virtual world. The travel, game play, and interactions usually occur through virtual characters, also known as figures or avatars, which represent each user in the virtual world.

Virtual characters can be customized by users to distinguish one user's virtual character from another, while in the virtual world. One way in which a virtual character can be personalized by a user is through the user's selection of the character's appearance. Elements impacting the appearance of a virtual character can include selection of the character's sex, body type, hair color, etc. Furthermore, characters can be dressed with pre-designed and pre-provided virtual clothes supplied to the user by a particular simulated virtual world.

Currently, there are products that provide a skilled user with the ability to create customized items for use in online virtual worlds. The items must then be uploaded by the user into the virtual world. However, creating a customized object, such as customized clothing to be worn by a user's avatar or figure, is complicated and requires the combined use of various graphics, animation, and image editing tools.

BRIEF DESCRIPTION OF THE DRAWINGS

The present invention is illustrated by way of example, and not by way of limitation, in the figures of the accompanying drawings and in which.

DETAILED DESCRIPTION

Figure 1:
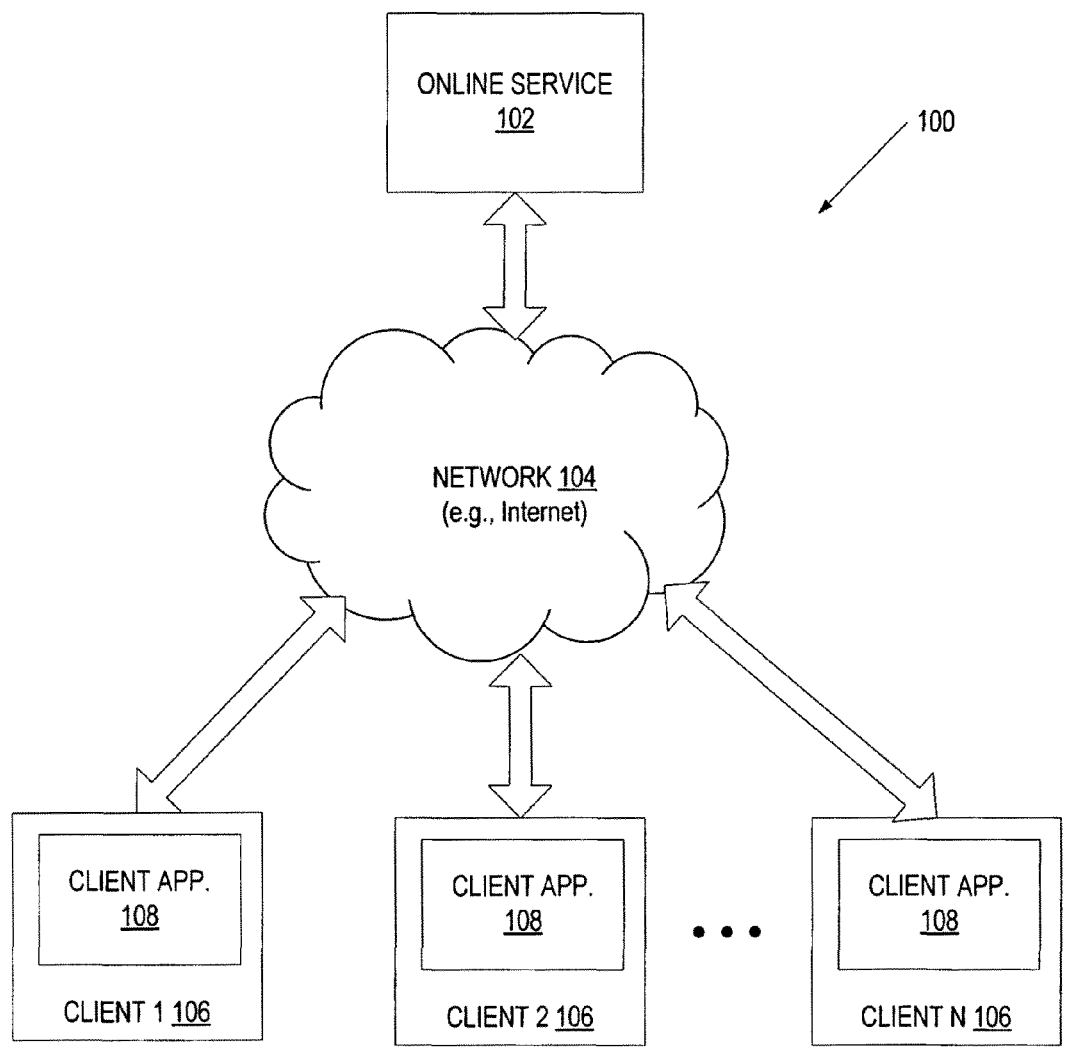
FIG. 1 illustrates one embodiment of network architecture in which embodiments of the present invention may operate.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may includes, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

The present invention may also be practiced in distributed computing environments where the machine readable medium is stored on and/or executed by more than one computer system. In addition, the information transferred between computer systems may either be pulled or pushed across the communication medium connecting the computer systems.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

A method and apparatus for automatically decorating a three-dimensional model with a user image file is described. In one embodiment, an image file is received form a user. The image is automatically formatted for display on the three-dimensional model in response to the image being received. The formatted image file is then stored in a database.

In one embodiment, the formatted image file is loaded from the database. After the image file is loaded, the image file is provided with texture coordinates that map to a region of the surface of the model. The three dimensional object is then rendered in a display device. After the three dimensional object has been rendered, in one embodiment, the model decorated by the formatted image file is rendered over the simulated three-dimensional object on the display device.

By way of example, and not limitation, a simulated three-dimensional object can be a virtual character, or avatar. When the virtual character is rendered in a three-dimensional virtual world, the character may graphically represent a user's online persona. Furthermore, according to one example, a three-dimensional model may be a model of a t-shirt that is to be worn by the rendered character. Thus, in one embodiment, when a user uploads a user image file, the user image file would automatically be formatted to decorate the t-shirt model to be worn by the virtual character, when the virtual character and t-shirt model are rendered in the three-dimensional virtual world.

Other examples of an object may include cars, buildings, machines, tanks, etc. may be rendered in a three-dimensional virtual world. Furthermore, models that decorate the object may include models of signs to be displayed on virtual buildings, logos to be displayed on the hood of a virtual car, annotations to be displayed on the surface of a machine, etc. Additionally, pants, jackets, hats, shoes, clothing accessories (e.g., purses, briefcases, backpacks, etc), helmets, etc. may be modeled and displayed and used in a simulated three-dimensional virtual world. Furthermore, any of these exemplary models and virtual objects, may be decorated by user image files as described herein.

FIG. 1 illustrates one embodiment of network architecture 100 in which embodiments of the present invention may operate. The architecture 100 includes an online service 102 coupled to a communications network 104 such as a public network (e.g., the Internet, a wireless network, etc.), private network (e.g., LAN, Intranet, etc.), or combination of public and/or private networks. The online service 102 communicates with multiple client devices (clients 1 through client N) 106 via the network 104.

Each client 106 hosts a client application 108. The client application 108 may be a web browser or some other program. The client application 108 provides users with the ability to navigate throughout a simulated three-dimensional world and interact with other users. Furthermore, client application 108 is responsible for allowing a user to build models, games, etc. that are physically realistic in a three-dimensional virtual world hosted by online service 102. Models are constructed from parts that automatically join together to aid the user in editing. A part may be a primitive geometrical shape such as a block, a cylinder, a sphere, etc., or some other primitive shape such as a wedge, a torus, a tube, a channel, etc. Games are created by placing models in the three-dimensional world. Games incorporate gameplay logic that triggers game events.

In one embodiment, the client application 108 uploads user images to the online service 102. As will be discussed in greater detail below, the client application 108 receives an image from a user (not shown). The image file is then transferred by the client application 108 to the online service 102 via network 104.

The online service 102 is responsible for storing models and images uploaded by users of the clients 106. A user may be, for example, a young child (e.g., 6-10 years old), an older child, a teenager, or an adult. Online service 102 maintains an image file storage and a model storage. As will be discussed in greater detail below, upon online service 102 receiving a user image, online service 102 automatically formats the image for display as decoration on a three-dimensional model. Online service 102 then stores the formatted user image and corresponding model in image file storage and model storage locations of the online service. In one embodiment, the image file received by online service 102 can be any image file uploaded by a user, such as a logo, photograph, drawing, embellishment, annotations, etc. In one embodiment, upon receipt of an image file by online service 102, online service automatically formats the image for display on a corresponding three-dimensional model. In alternative embodiments, the image may be formatted by online service 102 at some time after being uploaded to online service 102, but prior to rendering a model decorated by the user image to a client 106.

In one embodiment, online service 102 also receives, along with the user image file, user preferences for display characteristics of the automatically formatted image and corresponding three-dimensional model. The user preferences, in one embodiment, include an optional background color and/or pattern for the three-dimensional model to be decorated by the user image file. However, if no user preferences are received by the online service 102, a default background color, such as the color of the model or virtual character, is set as the user preferred display characteristic for the model decorated by the formatted image.

In one embodiment, online service 102, responsive to a user request received from a client application 108 to display a model decorated by a saved user formatted image, recalls the formatted image and the corresponding model from the storage locations of the online service 102. The model and the automatically formatted and saved user image are then transmitted by the online service 102 to the requesting client application 108. Client application then displays the three-dimensional model, decorated by the user image, on the client 106 to a user.

According to one example, the three-dimensional model is a model of a t-shirt worn by a three-dimensional character, or avatar, when the character is displayed in a three-dimensional world maintained by the online service 102. Furthermore, the model may also be a model that adorns, decorates, or is otherwise used by a three-dimensional character in the three-dimensional world maintained by the online service 102. Such exemplary models may include pants, shoes, jackets, hats, helmets, clothing accessories (e.g., briefcases, purses, backpacks, etc.) worn by a three-dimensional character. A three-dimensional character may also use various items within the three-dimensional world maintained by the online service 102, such as shields, cars, storefronts, signage, etc., as well as other items in the three-dimensional universe.

In one embodiment, a model is pre-configured to accept one or more user images, logos, adornments, etc. uploaded by a user to online service 102. For example, a t-shirt model may correspond with a specific texture template that includes one or more regions (e.g., the chest, back, left shoulder, right shoulder, breast pocket, etc.) where a user image will be utilized/accepted for adornment upon the model being rendered in a three-dimensional world.

Upon display of the decorated three-dimensional model at the client 106 to a user, the user is allowed to navigate through the three-dimensional world maintained by the online service 102. For example, a character or avatar that wears a three-dimensional t-shirt, decorated by an uploaded image as discussed herein, can move and interact with others in the three-dimensional world (e.g., chat, play games, interacts, etc.). The customized t-shirt provides users a way to distinguish their avatars while moving throughout the three-dimensional world maintained by the online service 102.

Furthermore, a user may select a game (created by this or other user) from a game catalog, maintained by the online service 102, to play. The game catalog includes images of games stored on the online service 102. In addition, a user may select a model (created by this or other user) from the model catalog to modify and/or add to a new game. The model catalog includes images of models stored on the online service 102. In one embodiment, the online service 102 conducts contests for model building, game building, or high scores in individual games.

Figure 2:
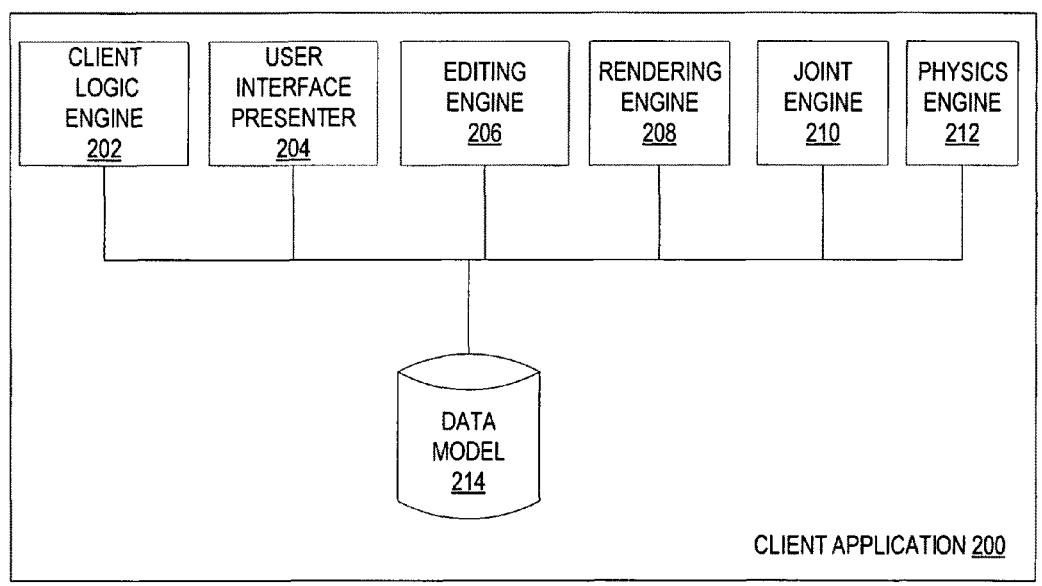
FIG. 2 is a block diagram of one embodiment of a client application.

As discussed above the client application 108 may be a web browser or some other application installed on the client 106 that is referred to herein as a desktop client application. FIG. 2 is a block diagram of one embodiment of a desktop client application 200. The desktop client application 200 may include a game logic engine 202, a user interface presenter 204, an editing engine 206, a rendering engine 208, a joint engine 210, physics engine 212 and a data model 214.

The game logic engine 202 is responsible for invoking components of the client application 200 based on user requests, and exchanging data with the online service 102 based on user requests.

The user interface presenter 204 is responsible for presenting user interfaces (UIs) to a user and receiving input provided by the user via the UIs. In one embodiment, UIs are presented in a window(s) of a browser application running on the client. Alternatively, UIs may be presented in a window(s) controlled by the client application 200. The UIs provided by the user interface presenter 204 may include, for example, a home page UI, a build UI, a game catalog UI, a model catalog UI, image upload UI, etc. The image upload UI may allow a user to upload a user image, and optional display characteristics, to the online service, as discussed above with respect to FIG. 1, so that the image will be automatically formatted to decorate a corresponding three-dimensional model. The home page UI may present to a user a list of available options (e.g., to build a new model or game, to access an existing model or game, etc.). The build UI may allow a user to select desired parts and/or models and may display the selected parts and/or models in a three-dimensional virtual world.

The editing engine 206 is responsible for editing new and existing games and models based on user input, defining properties of new and existing models and games, and creating and updating a data model 214 for each new and existing model and game. A data model 214 is a collection of data describing a game or a model that is structured using a specific format (e.g., XML schema, binary, or proprietary format).

The joint engine 210 is responsible for joining parts based on their proximity to each other in the three-dimensional world.

The rendering engine 208 is responsible for interpreting and displaying three-dimensional images of models and games within the three-dimensional view. In one embodiment, the rendering engine 208 is responsible for rendering a decorated three-dimensional model within the three-dimensional view. For example, rendering engine may display a user uploaded image on a model of a t-shirt worn by a character/avatar in the three-dimensional view.

The physics engine 212 is responsible for simulating the motion of objects (models and/or parts) displayed in the three-dimensional view. In one embodiment, the physics engine 212 simulates the object motion by computing object position and orientation on a frame by frame basis.

Figure 3:
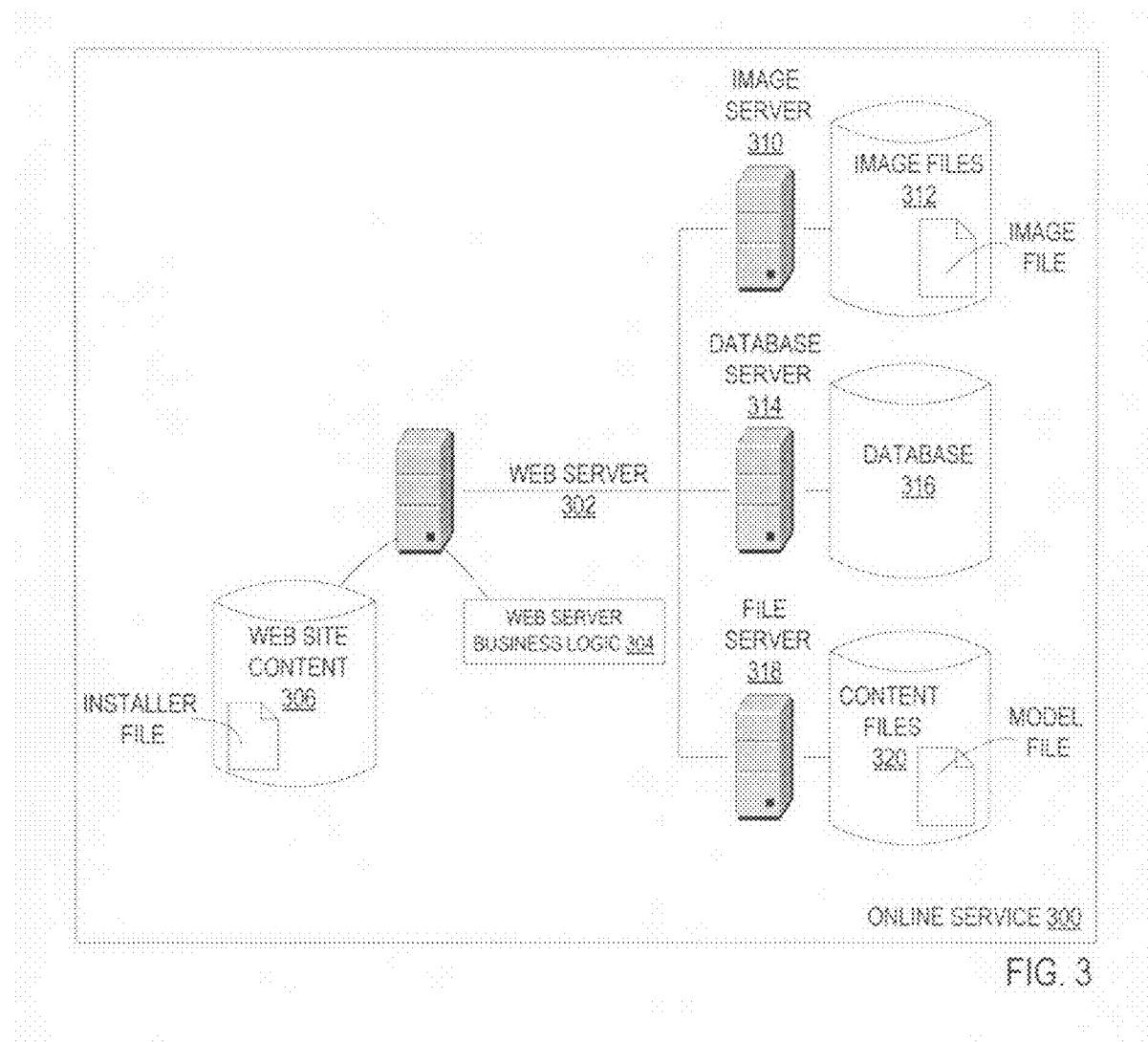
FIG. 3 illustrates one embodiment of an architecture of an online service.

FIG. 3 illustrates one embodiment of the architecture of an online service 300. The online service 300 includes a web server 302, an image server 310, a database server 314 and a file server 318.

The file server 318 stores content files 320 received from clients 106. These files may be, for example, in extensible markup language (XML) format, binary format, etc. The content files 320 may also include various large media files such as textures, skyboxes, sounds, etc. In one embodiment, file server 318 stores models, such as a t-shirt model, clothing accessory models, etc., to be decorated by a user image file upon the model being rendered and displayed to a user. The models may be pre-configured to accept one or more user images, logos, adornments, etc. uploaded by a user to online service 102.

In one embodiment, content files 320 include shirt objects, torso model objects, and texture templates, stored in XML format, standard generalized markup language (SGML) format, binary format, etc. An example shirt object included in the content files 320, according to one embodiment, is given below in Table 1. Additional fields and data values may be included in a shirt object consistent with the discussion herein.

TABLE 1

| Field | Data |
| --- | --- |
| ShirtObjectID | Identification data for a specific shirt object, corresponding to an ID value stored in database 316. |
| BackgroundColor | A color value, pattern, alpha transparency, or some combination of values |
| ImageID_Front | Pointer to an image stored in image files database 312 |
| ImageID_Back | Pointer to an image stored in image files database 312 |
| ImageID_LeftShoulder | Pointer to an image stored in image files database 312 |
| ImageID_RightShoulder | Pointer to an image stored in image files database 312 |

An example torso model object, corresponding to the shirt object presented above in Table 1, included in the content files 320, according to one embodiment, is given below in Table 2.

TABLE 2

| Field | Data |
| --- | --- |
| TorsoModelID | Identification data for a specific torso model object, corresponding to an ID value stored in database 316. |
| TextureTemplateID | Pointer to a TextureTemplate stored in image content files database 320 |
| FrontLocation | Data indicating values for topLeft and bottomRight coordinates for image to be displayed on a frontal location of the torso model |
| ImageID_Back | Data indicating values for topLeft and bottomRight coordinates for image to be displayed on a rear location of the torso model |
| ImageID_LeftShoulder | Data indicating values for topLeft and bottomRight coordinates for image to be displayed on a left shoulder/sleeve location of the torso model |
| ImageID_RightShoulder | Data indicating values for topLeft and bottomRight coordinates for |

TABLE 2-continued

| Field | Data |
| --- | --- |
| | image to be displayed on a right shoulder/sleeve location of the torso model |

Additional fields and data values may be included in a torso model object consistent with the discussion herein. For example a model of a three dimensional character may be adorned by various texture templates, such as t-shirt models, pants models, hat/helmet models, etc. When multiple models may adorn a character, corresponding object, such as pants objects, hat object, helmet objects, etc. are included in the content files 320. As discussed above, each pant, hat, helmet, etc. object would include the data field discussed above in Table 1. Furthermore, the torso model object, in the case of a three dimensional character, would be expanded to include TextureTemplateIDs 1 . . . N for each texture template to adorn the model, and texture template coordinates where various images would be located on the torso model.

Along with the model, additional data is stored that identifies images that will decorate the model upon the model being rendered, optional display characteristics of the model, as well as other data utilized in the display of a decorated model. As will be discussed below, a model may be decorated by more than one image file (e.g., a first image file may decorate the front of a three-dimensional model of a t-shirt, while a second image file may decorate the back of the t-shirt model). Furthermore, an image file may be utilized by more then one model as decoration of that model (e.g., a first model uses an emblem to decorate that model and another model uses the same emblem as decoration). Thus, in one embodiment, a model may be considered as a collection of a three-dimensional data meshes that includes vertices and texture template coordinates, a texture template that maps textures to the model, and additional data that indicates the texture template(s) to be used by various image, where a model, along with a corresponding texture template, are configured to accept images directly as adornment.

The image server 310 stores images files 312 that include images of models and games stored on the file server 318. The image files 320 also include user image files uploaded by the clients 106 to online service 300. The image files 320 may be stored as Portable Network Graphics (PNG) images, Joint Photographic Experts Group (JPEG) images, JPEG 2000 images, Graphic Interchange Format (GIF) images, etc., or a combination of differing image format types. Such user image files may include image files to be automatically formatted by the image server 310, prior to storage with image files 312, for decorating a corresponding model stored by the file server 318. In one embodiment, image server 310 generates identification (ID) data for the image prior to storage, so that online gaming service can reference the image by ID and write the image ID to the textureID field of the corresponding model.

The database server 314 hosts a database 316 that stores, for example, profile information of each user, account information of each user, game and model information, news information, information pertaining to online forums maintained by the online service 300, etc. In one embodiment, database 316 stores shirt object IDs, Torso Model IDs, texture template IDs, image IDs, etc. Database 316 maintains the identification data for the image files 312 and content files 320 of online service 300.

The profile information of each user may specify, for example, games created by a user, models created by a user, public information about a user (e.g., "About Me"), recently played games, favorite games, user scores and ratings, etc. In one embodiment, database 316 stores an inventory of objects created and/or owned by a user, including the clothing items currently worn by the user. An example database entry, which acts as an inventory for each user of online service 300, is presented in Table 3 below.

TABLE 3

| Field | Data |
| --- | --- |
| UserID | Identification data for each user of online service 300 |
| Name | Alphanumeric name for each user, such as a screen name, actual name, name registered on an account, etc. or a collection of the aforementioned |
| InventoryIDs1..N | Data indicating one through N items owned by a user |
| CurrentOutfit | |
| ShirtID | Identification data for a Shirt content object |
| PantsID | Identification data for a Pants content object |
| Character | |
| HeadModelID | Identification data for a Head model object for a character |
| TorsoModelID | Identification data for a Torso model object for a character |
| RightLegModelID | Identification data for a RightLeg model object for a character |
| LeftLegModelID | Identification data for a LeftLeg model object for a character |

The account information may also include, for example, user ID and password. The game and model information may include, for example, indexes of game and model files, indexes of corresponding game and model images, game creators, game creation dates, game popularity, user rankings of games, corresponding model and formatted user image files, etc. The news information may include, for example, general information about games, information about current contests (e.g., rewards offered for users who achieve high scores for a game, etc.), information about the three-dimensional world maintained by the online service, etc. The forum information may include, for example, discussions about games and models, technical support forum information, etc.

The web server 302 hosts web site content 306 and web server logic 304. The web server logic 304 receives content requests from clients 106 and sends pages (e.g., HTML pages) with the requested content to the clients 106. In one embodiment, the web server logic 304 is responsible for composing a web enabled user interface for receiving user image files to be uploaded to, and automatically formatted by, the online service 300, and sending pages containing these catalogs to the clients 106. The web site content 306 may include, for example, model and game catalogs, cached model and game files, an installer file for the client application 108, etc.

Figure 4:
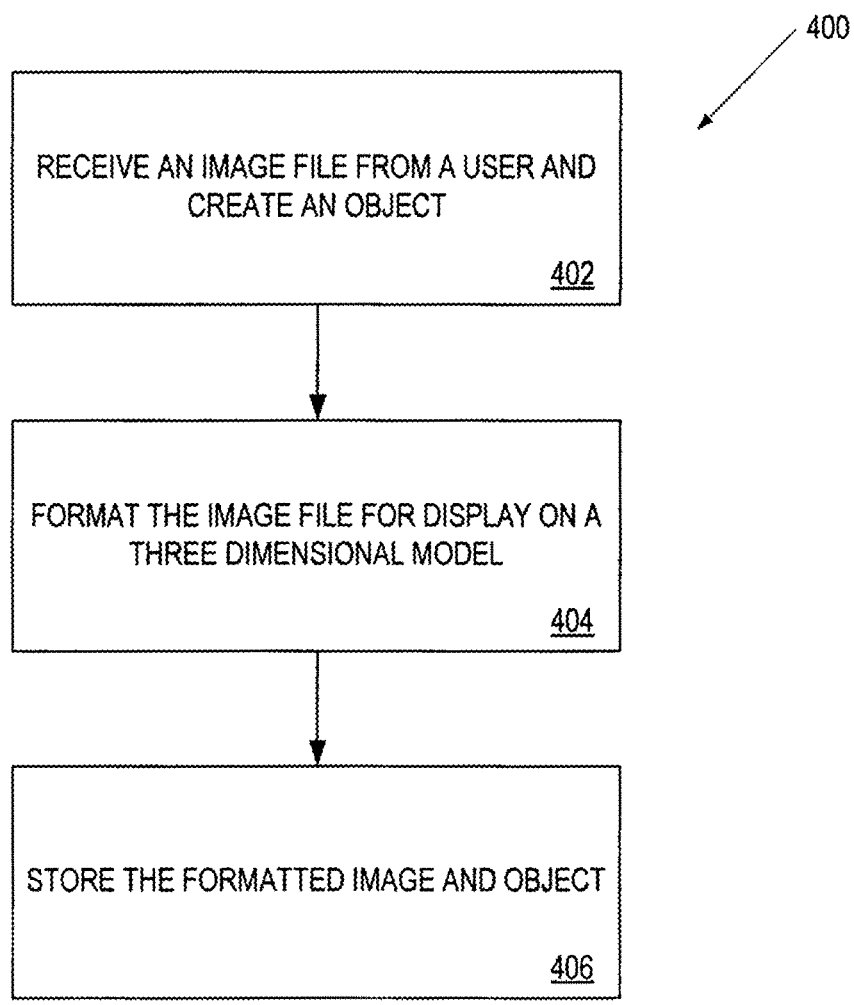
FIG. 4 is a flow diagram of one embodiment of a process for automatically decorating a three-dimensional model.

FIG. 4 is a flow diagram of one embodiment of a process 400 for automatically decorating a three-dimensional model. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in an online service 102 of FIG. 1.

Referring to FIG. 4, process 400 begins with processing logic receiving an image file from a user and creating a data object (processing block 402). In one embodiment, the user image file is received from the client application 108 (i.e., a web browser or a desktop client application). In another embodiment, the image file is "received" when selected from images stored by an online service. Because the image file is to adorn a three dimensional model, a corresponding object, such as a shirt object, pants object, etc. is created with the image ID when the image is uploaded. In one embodiment, the formatted user image file is provided with the ID by an image server such as image server 310 of FIG. 3.

In one embodiment, the processing performed by processing logic at processing block 404 is performed automatically in response to processing block 402 receiving the user image file.

At processing block 404, processing logic formats the image file for display on a three-dimensional model. In one embodiment, and as will be discussed in greater detail below, a texture template corresponding to the three-dimensional model to be decorated is provided. The resolution of the received user image file is adjusted so that the image at the adjusted resolution fits within an area defined by the texture template. In one embodiment, the resolution is adjusted to a maximum resolution so as to fill a maximum area of the provided texture template without exceeding the bounds of the texture template. Further, in one embodiment, an uploaded image is formatted to a standard resolution for use in adornments of three dimensional models, such as 128×128 pixels, 64×64 pixels, etc.

After the image has been formatted, processing logic stores the formatted image and object (processing block 402).

Figure 5:
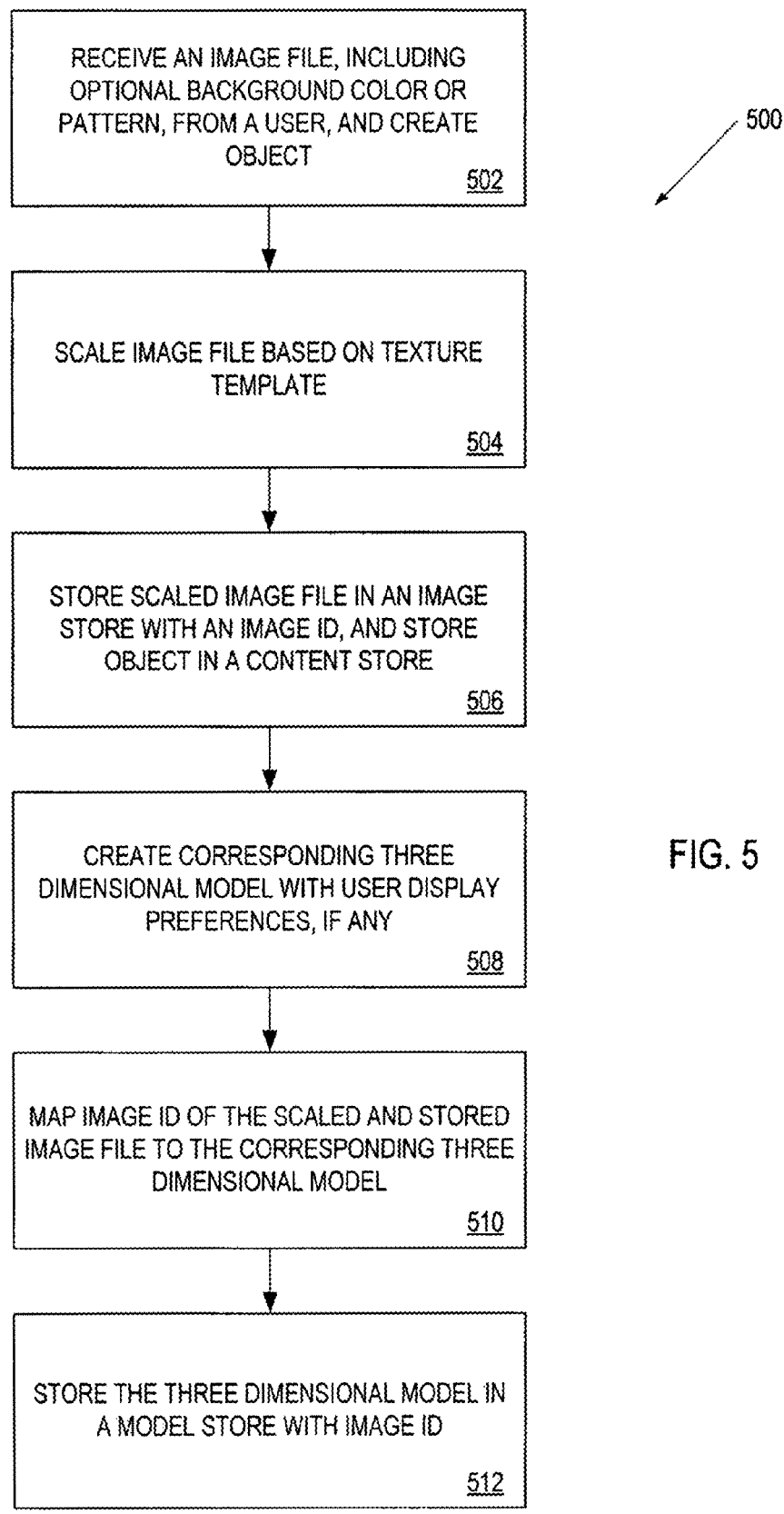
FIG. 5 is a flow diagram of another embodiment of a process for automatically decorating a three-dimensional model.

FIG. 5 is a flow diagram of another embodiment of a process 500 for automatically decorating a three-dimensional model. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in an online service 102 of FIG. 1.

Referring to FIG. 5, process 500 begins with processing logic receiving an image file, including optional background color and/or background pattern selections, from a user, and creating an object (processing block 502). The received image file may be any user supplied image file, such as a photographic image, drawing, logo, embellishment, annotation, etc. As discussed above, the received image is to be formatted for decoration of a three-dimensional model when the model is displayed in a simulated three-dimensional world, and the object is created along with receiving the image. Thus, additional data indicative of user selected background color and/or background patterns (e.g., display preferences) for the model are also received by processing logic (processing block 502). In one embodiment, the display preferences are optional, such that if no user display preferences are received by processing logic, a default value for each of the background color and pattern is provided to the received image. Thus, processing logic provides control of the display properties and appearance of the three-dimensional model to the user, thus enabling the user to customize and personalize three-dimensional models displayed in a simulated three-dimensional world. In one embodiment, the customized models include customized t-shirts, pants, shoes, etc. worn by a virtual character. Furthermore, other objects, such as signs on a store, the hood of a car, etc. that are displayed or used in a three-dimensional world, may also be customized by processing logic as discussed herein.

Furthermore, when an object, such as a t-shirt object may be adorned by multiple images, a user may supply or select multiple images for inclusion on specific regions of the t-shirt object, as well as assign which image will adorn which location of the three dimensional object.

After receiving the image, and optional user display preferences for the three-dimensional model, processing logic scales the received user image file based on a provided texture template corresponding to a three-dimensional model (processing block 504). In one embodiment, the image is formatted by scaling the image automatically upon processing block 502 receiving the user image file. Because the texture template corresponds to some part of a three-dimensional model (e.g., the front of three-dimensional model of a t-shirt, the hood of a three-dimensional model of a car, etc.), and the size of texture template may not necessarily equal the size of the user image, the image is scaled based on the provided texture template. Thus, the resolution (or pixel dimensions) of the image are adjusted so as not to exceed a maximum height or width of the texture template. In one embodiment, the original aspect ratio of the image is retained during the scaling, as performed by processing logic, so that the image is not distorted when rendered in a three-dimensional virtual world.

Because the original aspect ratio is maintained, there may be areas of the texture template not covered by the scaled image. When this occurs, in one embodiment, as part of the scaling process, a composite image is created that combines the scaled user image file and transparent alpha-channel image segment(s). Thus, the original image segment and the additional transparent alpha channel image segment(s) would cover the area of the texture template However, preservation of the image file's original aspect ratio is not a requirement. In such a case, the resolution of an image will be scaled to fill both the maximum height and width of the texture template, and deviations from the original aspect ratio are accomplished by stretching or shrinking the image. Thus, in embodiments that do not preserve the original image's aspect ratio, the resolution of the user image file will be adjusted to fill both of the maximum width or a maximum height of the provided texture template.

In one embodiment, the provided texture template is a rectangular texture template. Such a configuration of the provided texture template exploits the fact that image files are electronically designed and saved in a rectangular format. Thus, processing logic needs only scale a rectangular image onto a rectangular texture template, as opposed to an irregular texture template. In some embodiments, the texture template is flat and rectangular, as in a surface of a cuboid. However, so long as the texture template maps to a rectangle in two dimensions, the texture template may be curved in three dimensions. For example, a texture template may be provided that corresponds to a rectangular patch on a curved sleeve of a modeled three-dimensional shirt, while another texture template may be provided that maps onto a dynamic image of a waving three-dimensional rectangular flag, etc.

After processing logic has finished scaling the image, processing logic then stores the scaled image file and object with an image ID (processing block 506). In one embodiment, an image server such as image server 310 of FIG. 3 generates an ID for each image stored by the image server, and the scaled user image file is thereafter associated with the ID.

A corresponding three-dimensional model, with user display preferences if any, is then created by processing logic (processing block 508). In one embodiment, the three-dimensional model is a three-dimensional graphics construct that, when rendered, visually presents a three-dimensional graphical representation of a t-shirt, pants, jacket, shoes, hat, clothing accessories, car, sign, etc., as well as any other three-dimensional object for which a texture template has been provided. As discussed above, models within an online service, such as online service 300 of FIG. 3, may be stored as XML files with data fields including, but not limited to, corresponding texture IDs, a color value for the model, a pattern for the model, and a description of the shape of the model (typically given as a list of vertices, or a parametric description of the object). Whether the model shape description is given as a list of vertices, parametrically, etc., the shape description of the model includes texture coordinate information that is used to define coordinates on the surface of the model. If user-specified background color and/or pattern were received by processing logic, the values populate the corresponding fields for the model created by processing logic (processing block 508). However, if no user preference were received by processing logic, the values are populated with default values, such as for example a value specifying no background pattern and a value specifying a clear color for the model.

In one embodiment, the scaled and stored image file is then mapped to the corresponding three-dimensional model utilizing the image ID created by processing logic, and writing the image ID to the texture ID field of the corresponding image (processing block 510). However, the model may also be mapped to the stored image file via the creation of a pointer, an in-memory index, etc. from the texture ID field of the model to the scaled and saved user image file.

The process 500 ends after the model is stored with the image ID (processing block 512). In one embodiment, the model is stored by a file server, such as file server 318 of FIG. 3. Because the image and corresponding object are created and stored automatically upon processing logic receiving an image, a "single click" process is provided to a user for creating a decorated three-dimensional model from the image and corresponding object.

Figure 6A:
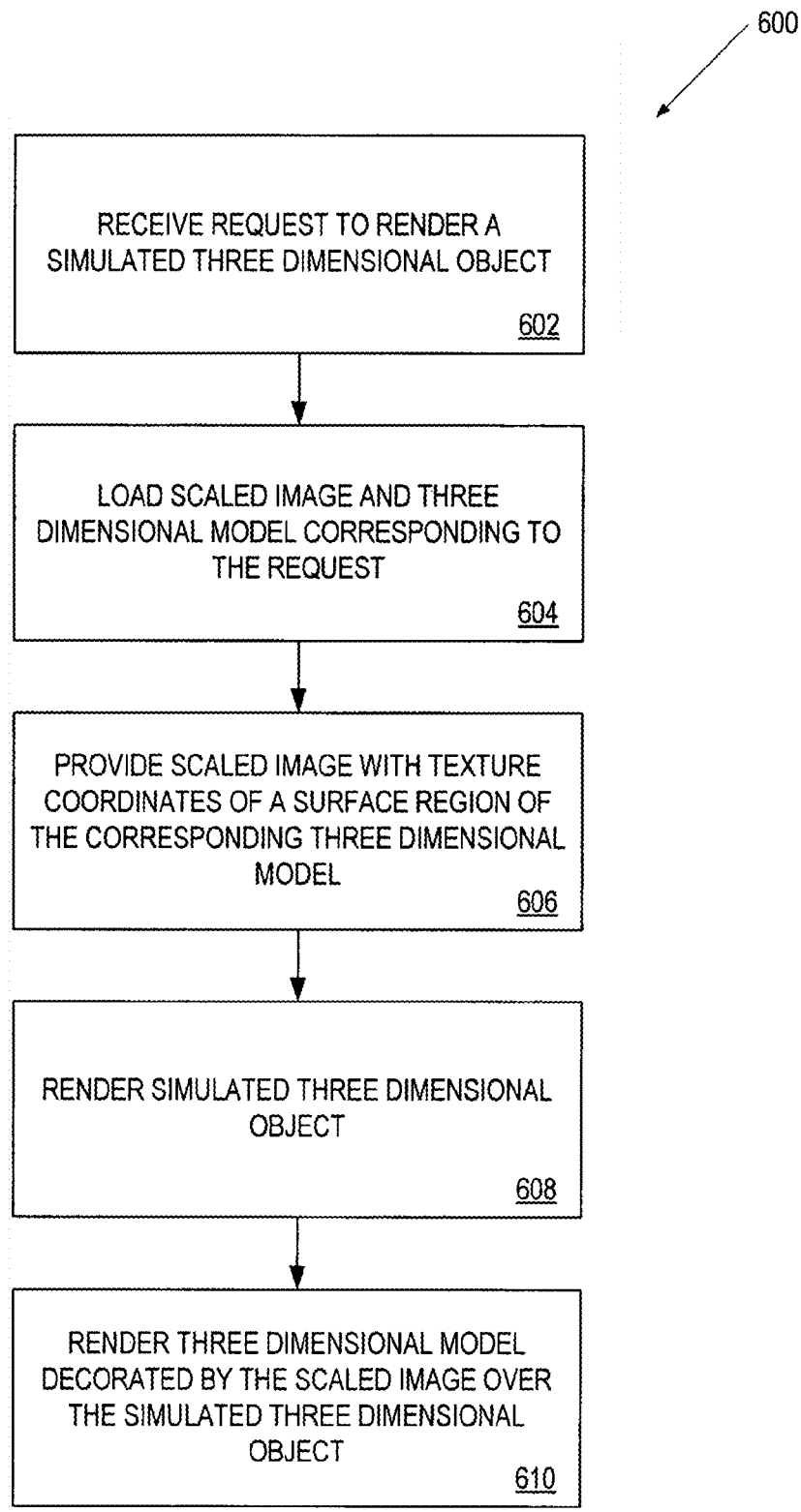
FIG. 6A is a flow diagram of one embodiment of a process for rendering a decorated three-dimensional model.

FIG. 6A is a flow diagram of one embodiment of a process 600 for rendering a decorated three-dimensional model. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a client application 108 of FIG. 1.

Referring to FIG. 6A, process 600 begins with processing logic receiving a request to render a simulated three-dimensional object (processing block 602). In one embodiment, the simulated three-dimensional object is to be decorated with a previously formatted user image and three-dimensional model, as discussed above with respect to FIGS. 4 and 5. For example, in one embodiment, processing logic may receive a request to render three-dimensional figure, or avatar, in a three-dimensional virtual world. In one embodiment, the request is received along with a userID of the user originating the request.

In response to receiving the request, processing logic loads a scaled image and corresponding three-dimensional model (processing block 604). Thus, in the example above, the model loaded by processing logic may be a t-shirt, to be decorated by the scaled user image with the corresponding image ID. In one embodiment, given the received user ID, a CurrentOutfit and Character corresponding to the userID may be determined. Furthermore, imageIDs may be determined form the shirtObject in the user's CurrentOutfit, and a TorsoTemplate may be determined from the TorsoModel in the user's Character.

After loading the scaled image, processing logic provides the scaled image with texture coordinates of a surface region of the corresponding three-dimensional model (processing block 606). In one embodiment, the texture coordinates are utilized by the processing logic as a location of where to draw the user image file upon rendering the model decorated by the user image file.

In one embodiment where the model is a three-dimensional model of a t-shirt, the texture coordinates may specify that the user image is to be rendered on a front, back, sleeve, pocket, etc. of the t-shirt. In embodiments where the model corresponds to three-dimensional objects, such as pants, shoes, jackets, shield, billboards, helmets, cars, etc. displayed in the three-dimensional virtual world, the texture coordinates would specify the appropriate location of the three-dimensional model upon which the image would be rendered by processing logic.

In another embodiment, where multiple images are to adorn a three-dimensional element, such as a Shirt object, a texture is dynamically created that combines all images references in the Shirt object. As such each of the individual images is combined into a texture of a single image. The texture coordinates for each individual image are determined from, for example a torso model corresponding to the Shirt object.

Processing logic then renders the requested simulated three-dimensional object (processing block 608). The three-dimensional object may be any of a person, block character, avatar, clothing accessory (e.g., briefcase, purse, backpack, etc.), car, virtual storefront, virtual billboard, etc.

After processing logic has rendered the three-dimensional object, processing logic renders the three-dimensional model decorated by the scaled image over the simulated three-dimensional object (processing block 610). Thus, in one embodiment, processing logic would render the user customized shirt model over the user's virtual character in the three-dimensional virtual world. In another embodiment, processing logic would render the combined texture image and shirt model over the user's virtual character to adorn the character with multiple images. Therefore, in a sense, the user's character is rendered "wearing" the customized t-shirt. In one embodiment, because the model includes data fields that specify model color and background patters, if any, processing logic renders the model according to these user display criteria.

Figure 6B:
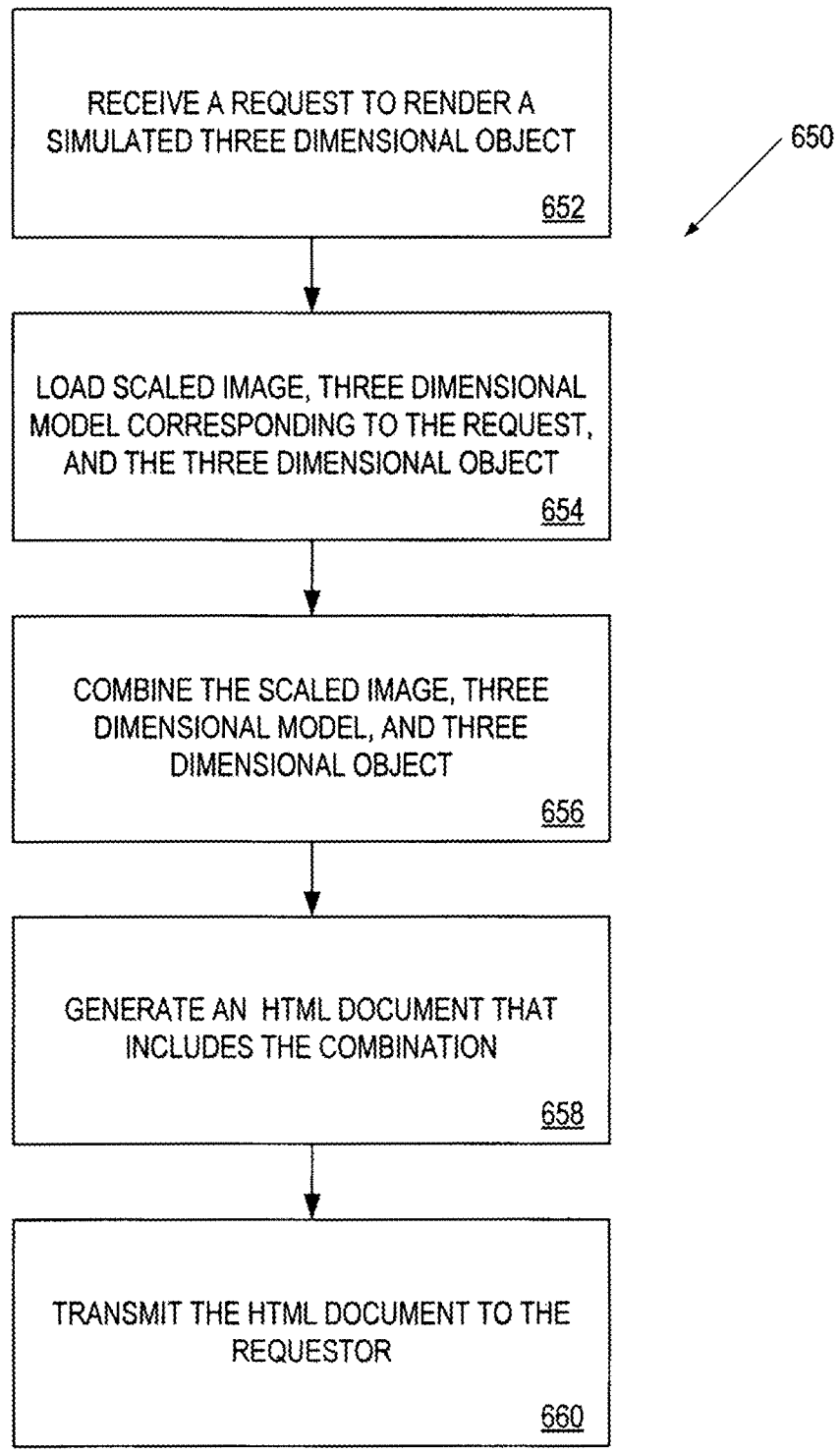
FIG. 6B is a flow diagram of another embodiment of a process for rendering a decorated three-dimensional model.

FIG. 6B is a flow diagram of an embodiment of a process 650 for rendering a decorated three-dimensional model. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a server of an online service, such as online service 102 of FIG. 1.

Referring to FIG. 6B, process 650 begins with processing logic receiving a request to render a simulated three-dimensional object (processing block 652). In one embodiment, a server receives a request to render a simulated three-dimensional object, which is to be decorated with a previously formatted user image and three-dimensional model, as discussed above with respect to FIGS. 4 and 5.

In response to receiving the request, processing logic loads a scaled image, corresponding three-dimensional model, and simulated three-dimensional object (processing block 654). Thus, in the example above, the model loaded by processing logic may be a t-shirt, to be decorated by the scaled user image with the corresponding image ID, as well as the three-dimensional model of the avatar that will "wear" the decorated t-shirt.

After loading the scaled image, three-dimensional model, and simulated three dimensional object, processing logic combines the scaled image, three-dimensional model, and three-dimensional object (processing block 656). In one embodiment, processing logic combines the image, model, and object by rendering each element at the server, thereby completely rendering requested three-dimensional object at the server. In one embodiment, texture coordinates are utilized by the processing logic as a location of where to draw the user image file upon rendering the model decorated by the user image file.

Processing logic then generates a hypertext markup language (HTML) document that includes the combination of rendered image, three-dimensional model, and three-dimensional object (processing block 658). In one embodiment, processing logic creates an HTML document, however processing logic may also create an extensible markup language (XML) document, extensible hypertext markup language (XHTML) document, etc.

After the creation of the HTML document, processing logic transmits the HTML document, which includes the combination, to the requestor (processing block 660). In one embodiment, processing logic transmits the HTML document from a server to the requesting client device, so that the client device is able to display the HTML web page including the requested three-dimensional object.

Figure 7:
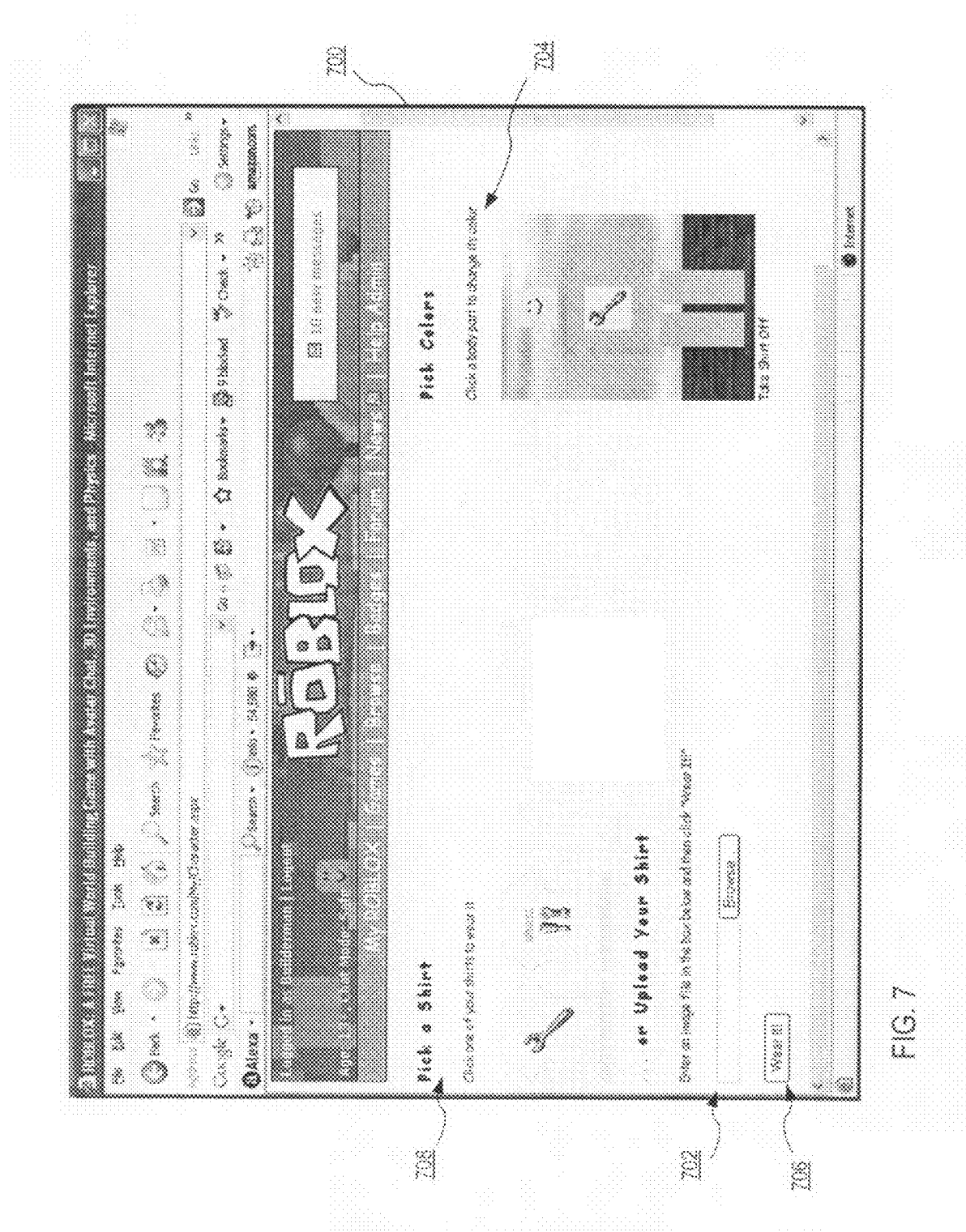
FIG. 7 shows an exemplary representation of a user interfaces facilitating automatic decoration of a three-dimensional model.

FIG. 7 illustrates an exemplary representation of a user interface 700 that allows a user to upload a user image file 702, specify background colors and patterns when displayed on the corresponding decorated model 704, and display the decorated three-dimensional model 706. In the illustrated embodiment, the user image file decorates a three-dimensional model of a t-shirt to be worn by a three-dimensional character or avatar of a user when displayed in a three-dimensional world. Similar user interfaces may allow a user to similarly decorate three-dimensional models of pants, jackets, shoes, hats, helmets, shields, clothing accessories, etc. Furthermore, similar user interfaces may allow a user to similarly decorate a portion, such as a sleeve of shirt, of any of the three-dimensional models listed above. Additionally, if a user has previously created and saved a decorated model, the user interface may allow the user to select previously created models 708.

Figure 8:
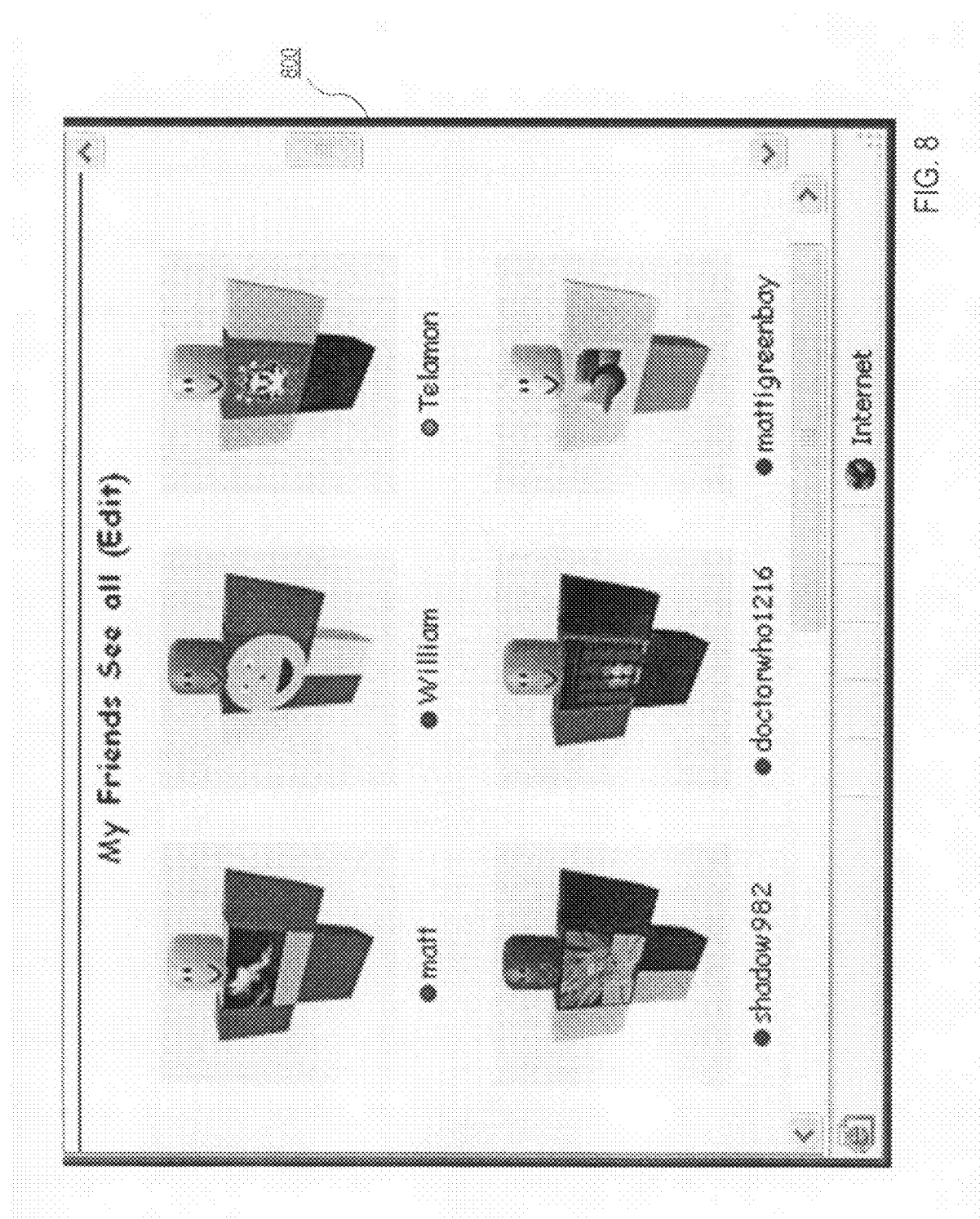
FIG. 8 shows an exemplary representation of various decorated figures.

FIG. 8 shows an exemplary representation of various decorated figures.

Figure 9:
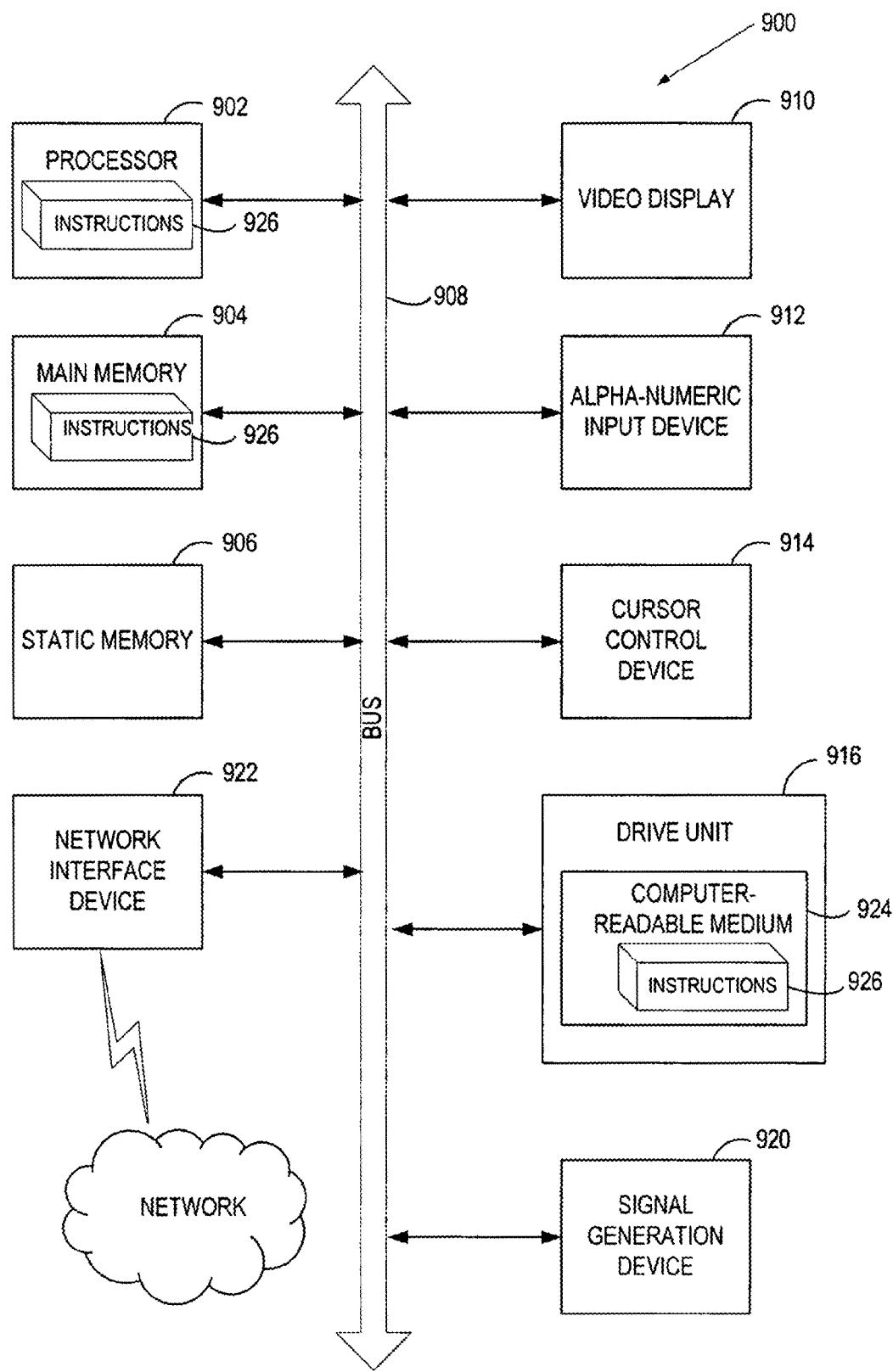
FIG. 9 is a block diagram of one embodiment of a computer system.

FIG. 9 shows a diagrammatic representation of machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g. a keyboard), a cursor control device 914 (e.g. a mouse), a disk drive unit 916, a signal generation device 920 (e.g., a speaker) and a network interface device 922.

The disk drive unit 916 includes a computer-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 922. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to included, but not be limited to, solid-state memories, optical and magnetic disks, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    receiving, by a computer system, a two-dimensional (2D) image from a user to customize a three-dimensional character for control by the user in a multi-player simulated three-dimensional virtual game, wherein the three-dimensional character is based on a three-dimensional block character, the 2D image to be a texture on a three-dimensional model upon rendering the three-dimensional model in the multi-player simulated three-dimensional virtual game, the three-dimensional model to be a decoration of the three-dimensional character in the multi-player simulated three-dimensional game;
    determining a texture template corresponding to the three-dimensional model, wherein the texture template provides a guide on how to arrange the 2D image on a surface of the three-dimensional model, and wherein the texture template is to provide texture coordinates that map the 2D image to the three-dimensional model;
    assigning the texture coordinates to the 2D image in response to arranging the 2D image on the surface of the three-dimensional model based on the texture template;
    storing the 2D image in a database; and
    linking the 2D image with the assigned texture coordinates to the three-dimensional model using a content file associated with the three-dimensional model, wherein the content file comprises an object identification data field indicating the three-dimensional model associated with the content file, a background color data field indicating a background color of the three-dimensional model, a location data field indicating the assigned texture coordinates for the 2D image, and a pointer to the 2D image stored in the database.

2. The method of claim 1, wherein the three-dimensional model, using the 2D image as the texture, is the decoration for a plurality of three-dimensional characters upon rendering the plurality of three-dimensional characters in the multi-player simulated three-dimensional virtual game.

3. The method of claim 1, further comprising
scaling the 2D image to fit into the texture template corresponding to the three-dimensional model, wherein the texture template defines the texture for a region of the three-dimensional model.

4. The method of claim 3, wherein scaling the 2D image to fit into the texture template further comprises
modifying a resolution of the 2D image to fit the 2D image into a first area of the texture template.

5. The method of claim 4, further comprising
creating a composite image file composed of the scaled 2D image, and alpha-channel image file segments for a second area of the texture template not covered by the scaled 2D image.

6. The method of claim 4, wherein modifying the resolution of the 2D image scales the 2D image to a maximum resolution, wherein the maximum resolution is defined by either a maximum scaled width or a maximum scaled height of the scaled 2D image that does not exceed a maximum width or maximum height of the texture template.

7. The method of claim 3, wherein the scaling preserves an original aspect ratio of the 2D image.

8. The method of claim 1, further comprising:
loading the 2D image with the assigned texture coordinates; and
rendering the three-dimensional model with the 2D image as the decoration of the three-dimensional character.

9. The method of claim 1, wherein the three-dimensional character is selected from one of a person, an avatar, or a car.

10. The method of claim 1, wherein the texture template is selected from one of a texture template of a t-shirt, a pant, a jacket, a shield, a hat, a purse, a briefcase, or a part of a car.

11. The method of claim 1, wherein the texture on the three-dimensional model is at least one of a texture of a t-shirt, a pant, a jacket, a shield, a hat, a purse, a briefcase, or a part of a car.

12. The method of claim 1, further comprising:
receiving a selection, along with an image file of the 2D image, of at least one of a color, a pattern, or an image transparency; and
designating the background color of the three-dimensional model as a user-specified background color based on the received selection.

13. A system, comprising:
a database; and
an image server system, coupled with the database, to:
receive a two-dimensional (2D) image from a user to customize a three-dimensional character for control by the user in a multi-player simulated three-dimensional virtual game, wherein the three-dimensional character comprises a three-dimensional block character, the 2D image to be a texture on a three-dimensional model upon rendering the three-dimensional model in the multi-player simulated three-dimensional virtual game, the three-dimensional model to be a decoration of the three-dimensional character in the multi-player simulated three-dimensional virtual game;
determine a texture template corresponding with the three-dimensional model, wherein the texture template provides a guide on how to arrange the 2D image on a surface of the three-dimensional model, and wherein the texture template is to provide texture coordinates that map the 2D image to the three-dimensional model;
assign the texture coordinates to the 2D image in response to arranging the 2D image on the surface of the three-dimensional model based on the texture template;
store the 2D image in the database; and
link the 2D image with the assigned texture coordinates to the three-dimensional model using a content file associated with the three-dimensional model, wherein the content file comprises an object identification data field indicating the three-dimensional model associated with the content file, a background color data field indicating a background color of the three-dimensional model, a location data field indicating the assigned texture coordinates for the 2D image, and a pointer to the 2D image stored in the database.

14. The system of claim 13, the image server system further to:
scale the 2D image to fit into the texture template corresponding to the three-dimensional model, wherein the texture template defines the texture for a region of the three-dimensional model.

15. The system of claim 14, wherein to scale the 2D image to fit into the texture template, the image server system is further to:
modify a resolution of the 2D image to fit the 2D image into a first area of the texture template, wherein the image server system is further to
create a composite image file composed of the scaled 2D image, and alpha-channel image file segments for a second area of the texture template not covered by the scaled 2D image.

16. The system of claim 13, wherein the three-dimensional model, using the 2D image as the texture, is the decoration for a plurality of three-dimensional characters upon rendering the plurality of three-dimensional characters in the multi-player simulated three-dimensional virtual game.

17. The system of claim 13, further comprising:
the image server system to load the 2D image with the assigned texture coordinates, and transmit the 2D image with the texture coordinates that map to a region of the surface of the three-dimensional model; and
a rendering engine to render the three-dimensional character with the decoration, the decoration comprising the three-dimensional model with the 2D image as the texture of the surface of the three-dimensional model.

18. The system of claim 13, wherein the three-dimensional character is selected from one of a person, an avatar, or a car.

19. The system of claim 13, wherein the texture template is selected from one of a texture template of a t-shirt, a pant, a jacket, a shield, a hat, a purse, a briefcase, or a part of a car.

20. The system of claim 13, the image server system is further to:
receive a selection, along with an image file of the 2D image, of at least one of a color, a pattern, or an image transparency that designates the background color of the three dimensional model as a user-specified background color.

21. A non-transitory computer readable medium that provides instructions, that when executed by a processor, cause the processor to perform operations comprising:

receiving a two-dimensional (2D) image from a user to customize a three-dimensional character for control by the user in a multi-player simulated three-dimensional virtual game, wherein the three-dimensional character is a three-dimensional block character, the 2D image file to be a texture on a three-dimensional model upon rendering the three-dimensional model in the multi-player simulated three-dimensional virtual game, the three-dimensional model to be a decoration of the three-dimensional character in the multi-player simulated three-dimensional virtual game;

determining a texture template corresponding with the three-dimensional model, wherein the texture template provides a guide on how to arrange the 2D image on a surface of the three-dimensional model, and wherein the texture template is to provide texture coordinates that map the 2D image to the three-dimensional model;

assigning the texture coordinates to the 2D image in response to arranging the 2D image on the surface of the three-dimensional model based on the texture template;

storing the 2D image in a database; and linking the 2D image with the assigned texture coordinates to the three-dimensional model using a content file associated with the three-dimensional model, wherein the content file comprises an object identification data field indicating the three-dimensional model associated with the content file, a background color data field indicating a background color of the three-dimensional model, a location data field indicating the assigned texture coordinates for the 2D image, and a pointer to the 2D image stored in the database.

22. The non-transitory computer readable medium of claim 21, the operations further comprising:

scaling the 2D image to fit into the texture template corresponding to the three-dimensional model, wherein the texture template defines the texture for a region of the three-dimensional model.

23. The non-transitory computer readable medium of claim 21, the operations further comprising:

loading the 2D image with the assigned texture coordinates; and rendering the three-dimensional model with the 2D image as the decoration of the three-dimensional character.

* * * * *